Figure 1:
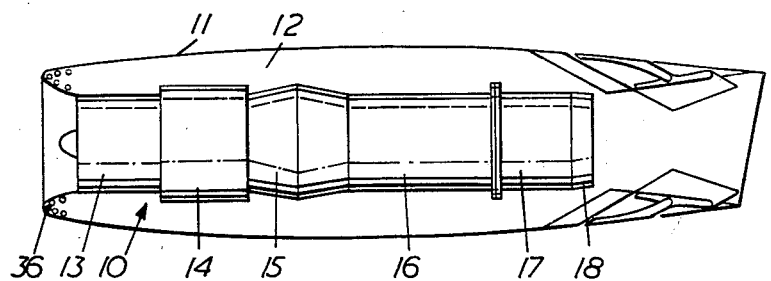

March 9, 1965 T. H. KERRY ETAL 3,172,256
JET ENGINE THRUST REVERSERS
Filed Feb. 12, 1962 3 Sheets-Sheet 1

Inventor
Thomas Henry Kerry
Peter Arthur Ward
By Fred E. Shoemaker
Fred L. Witherspoon Attorneys March 9, 1965  T. H. KERRY ETAL  3,172,256
JET ENGINE THRUST REVERSERS Filed Feb. 12, 1962  3 Sheets-Sheet 2

Inventor
Thomas Henry Kerry
Peter Arthur Ward
By
Fred P. Shoemaker
Fred L. Witherspoon
Attorneys March 9, 1965     T. H. KERRY ETAL     3,172,256
JET ENGINE THRUST REVERSERS
Filed Feb. 12, 1962     3 Sheets-Sheet 3
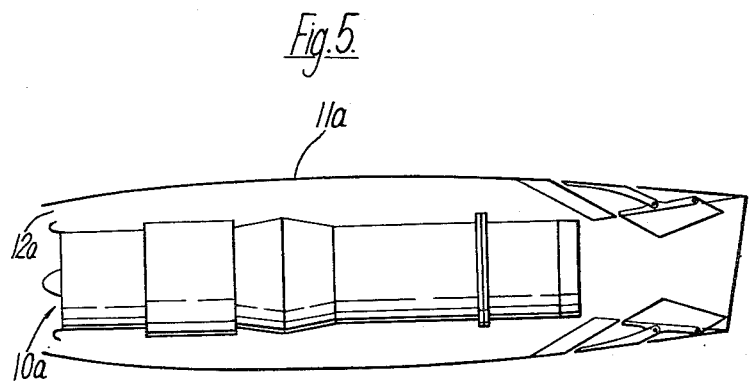

United States Patent Office 3,172,256
Patented Mar. 9, 1965

3,172,256
JET ENGINE THRUST REVERSERS
Thomas Henry Kerry, Derby, and Peter Arthur Ward, Littleover, Derby, England, assignors to Rolls-Royce Limited, Derby, England, a company of Great Britain
Filed Feb. 12, 1962, Ser. No. 172,482
Claims priority, application Great Britain, Feb. 13, 1961, 5,348/61
5 Claims. (Cl. 60—35.54)

This invention concerns jet engine thrust reversers.

According to the present invention, there is provided a jet engine assembly comprising a jet engine, a final propulsion nozzle therefor, thrust reverser members carried by a portion of said nozzle, means for moving the thrust reverser members between an inoperative position, in which they form a part of the wall of the said portion past which part of the exhaust gases flow rearwardly, and an operative position, in which they block the nozzle, and guide means for directing forwardly exhaust gases whose rearward travel has been blocked by the thrust reverser members.

Preferably the said portion is a divergent portion of the nozzle.

The guide means preferably comprise guide members which are arranged to be moved in unison with the thrust reverser members so that when the latter are respectively in their inoperative and operative positions the guide members are respectively in an inoperative position in which they effect at least partial blocking of forwardly directed gas flow passages and an operative position in which they unblock the passages and form forwardly directed walls thereof. The said guide members are preferably pivotally connected to the thrust reverser members and have a pin and slot connection with the nozzle.

At least one of said guide members may block only a portion of the respective gas flow passage, there being provided one or more guide vanes carried by said nozzle and means for moving said guide vane or vanes in unison with the thrust reverser members and between inoperative and operative positions in which the guide vane or vanes respectively block the remaining portion of said passage and provide forwardly directed surfaces therein.

There may be a plurality of said guide vanes and these may be pivotally mounted, there being provided a linkage, actuated by movement of the respective thrust reverser member, for effecting pivotal movement of the guide vanes.

The jet engine is preferably mounted within a nacelle which has a divergent internal wall at its downstream end, said divergent internal wall extending downstream of the downstream end of the engine, and the thrust reverser members, when in the inoperative position, forming part of said divergent internal wall.

Preferably there is an annular space between the engine and the nacelle, the upstream end of said annular space being open to boundary layer flow and the downstream thereof being open to the flow of exhaust gases from the engine, whereby boundary layer air is drawn into the exhaust gases by the ejector effect of the latter.

Figure 2:
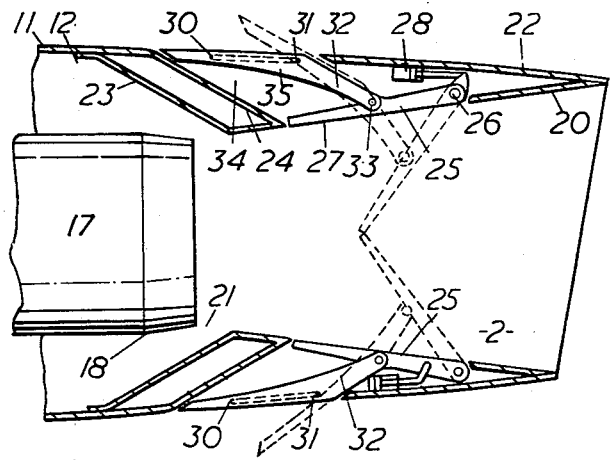
Figure 3:
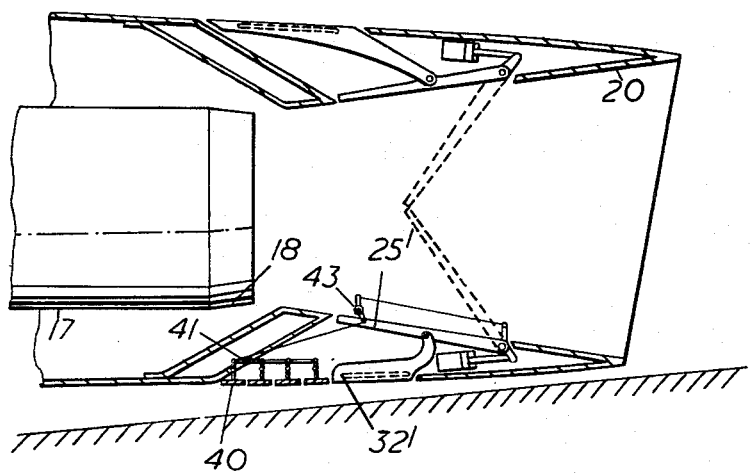
Figure 4:
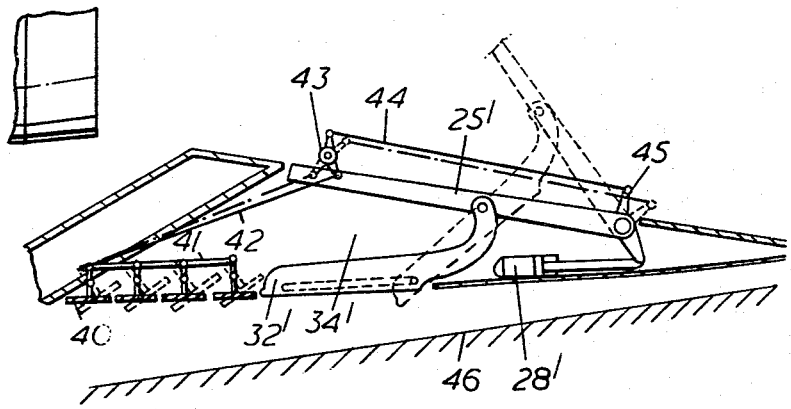

The invention is illustrated, merely by way of example, in the accompanying drawings, in which:

FIGURE 1 is a diagrammatic view of a jet engine assembly according to the present invention, FIGURE 2 is a diagrammatic, broken away section showing, on a larger scale, the downstream end of the jet engine assembly of FIGURE 1, FIGURE 3 is a view similar to FIGURE 2 but illustrating another embodiment of the invention, FIGURE 4 is a diagrammatic broken away section showing, on a larger scale, part of the structure shown in FIGURE 3, and FIGURE 5 is a view, similar to FIG. 1 but illustrating a modification.

Referring first to FIGURES 1 and 2, a gas turbine, jet propulsion, engine 10 for an aircraft is mounted within and is connected at its upstream end to a nacelle 11, an annular space 12 being provided between the engine 10 and the nacelle 11.

The engine 10 comprises in flow series a compressor 13, combustion equipment 14, and a turbine 15, the turbine exhaust gases being directed to atmosphere through a jet pipe 16. At its downstream end, the jet pipe 16 is provided with a nozzle 17 having a convergent portion 18 whose effective area may be varied by means not shown.

The nacelle 11 has, at its downstream end, an internal wall 20 which diverges in a downstream direction and which extends downstream of the downstream end of the nozzle 17. The upstream end of the wall 20 is spaced from the nozzle 17 by an annular gap 21 which communicates with the downstream end of the annular space 12. The convergent portion 18 and divergent internal wall 20 together constitute a final propulsion nozzle for the engine 10.

The nacelle 11 has an outer wall 22, the divergent internal wall 20 being secured to the outer wall 22 at its downstream end and, at its upstream end, being connected to the wall 22 by forwardly inclined walls 23, 24.

Two diametrically oppositely disposed thrust reverser flap members 25 are mounted on pivots 26 and have gas-contacting surfaces 27. When the flap members 25 are disposed in the inoperative position shown in full lines in FIGURE 2, the surfaces 27 in effect form part of the divergent internal wall 20.

The flap members 25 are movable by pneumatically or hydraulically operated rams 28 between the said inoperative position and an operative position (shown in dotted lines in FIGURE 2) in which they contact each other on the longitudinal axis of the engine and block the final propulsion nozzle to exhaust gas flow therethrough.

The outer wall 22 of the nacelle 11 is provided with diametrically oppositely disposed slots 30 in which ride pivot pins 31 carried by guide vanes 32. Each of the guide vanes 32 is pivotally connected to a flap member 25 at 33.

The guide vanes 32 are mounted within forwardly directed gas flow passages 34, the walls 24 forming forwardly inclined upstream end walls of the passages 34. The guide vanes 32 are movable between an inoperative position (shown in full lines in FIGURE 2) in which they block the passages 34 and an operative position (shown in dotted lines in FIGURE 2) in which they unblock the passages 34. In the said operative position, surfaces 35 on the guide vanes 32 form forwardly inclined downstream walls of the passages 34.

The nacelle 11 is provided at its upstream end with holes 36 through which boundary layer air may pass to the annular space 12.

In operation, when the flap members 25 and guide vanes 32 are in their inoperative positions, the exhaust gases pass rearwardly over the wall 20 and provide the aircraft with forward thrust. The flap members 25 will at this time substantially seal against the walls 24 so as to prevent ingress of the exhaust gases into the passages 34.

The flow of exhaust gases past the annular gap 21 will exercise the ejector effect such as to draw boundary layer air in through the holes 36, this air passing through the annular space 12 and annular gap 21 so as to be drawn into the exhaust gas stream.

When it is desired to effect thrust reversal, the rams 28 are operated to move the flap members 25 into their operative positions. The movement of the flap members 25 causes movement of the pins 31 in the slots 30 and pivotal movement of the guide vanes 32 into their operative positions. The exhaust gases will therefore be prevented by the flap members 25 from passing rearwardly and will flow into the passages 34 where the forward inclination of the guide vanes 32 and walls 24 will direct the exhaust gases forwardly.

It may be advisable to provide a closure device (not shown) to prevent reverse flow of the exhaust gases through the annular gap 21 and annular space 12.

In FIGURES 3 and 4 there is shown an embodiment which is generally similar to that of FIGURES 1 and 2 and which, for this reason, will not be described in detail.

In the construction of FIGURES 3 and 4, however, the lower flap member (designated 25') is pivotally connected to a guide vane 32' which is adapted, in its inoperative position, to block only a portion of the respective gas flow passage 34'. The remaining portion of the passage 34' is adapted to be blocked and unblocked by pivotally mounted guide vanes 40.

The guide vanes 40 are connected together by a tie rod 41 and are connected by a link 42 to a lever 43. The lever 43 is pivotally mounted on fixed structure and is connected by a link 44 to an arm 45. The arm 45 is secured to the flap member 25' so that as the latter is moved by its ram 28' into its operative position, the guide vanes 40 will be moved into their operative positions in which they permit flow through the passage 34' and direct the exhaust gases forwardly.

Since the guide vane 32' is substantially shorter than the guide vanes 32 of FIGURES 1 and 2, the guide vane 32', when in the operative position, projects outwardly of the nacelle to a substantially reduced extent. There will therefore be greater clearance, in the construction of FIGURES 3 and 4, between the nacelle and the ground, the latter being indicated at 46.

In the constructions shown in the drawings, the thrust reversers are arranged within the normal length of the final propulsion nozzle instead of being constituted by separate members. The length and weight of the engine are therefore reduced.

In FIGURE 5 there is shown an embodiment of the invention which is generally similar to that of FIG. 1 and which for this reason will not be described in detail.

The FIGURE 5 embodiment comprises a gas turbine, jet propulsion engine 10a which is mounted within a nacelle 11a and is spaced therefrom by an annular space 12a.

In the FIGURE 5 embodiment, however, the upstream end of the engine 10a is not connected to the nacelle 11a and the boundary layer air may therefore pass directly through the annular space 12a without having to pass through holes such as the holes 36 of the FIGURE 1 construction.

We claim:

1. A jet engine assembly comprising a jet engine, a final propulsion nozzle therefor, thrust reverser members pivotally mounted on a portion of said nozzle at their downstream ends, means for pivoting the thrust reverser members about their downstream ends between an inoperative position, in which they form a part of the inner wall of the said nozzle portion past which the exhaust gases flow rearwardly, and an operative position, in which the upstream ends of said thrust reverser members are in contact with each other, and they block the nozzle, a forwardly directed gas flow passage communicating with the said nozzle portion, a guide member having its downstream end pivotally connected to a thrust reverser member intermediate the ends thereof and having its upstream portion slidably connected to the nozzle by a pin and slot connection, and movable in unison with the thrust reverser member between an inoperative position in which it blocks only a portion of the outer end of the gas flow passage and an operative position in which it forms a forwardly directed wall, at least one guide vane carried by said nozzle, and means for moving said guide vane in unison with the thrust reverser members and said guide member between inoperative and operative positions in which the guide vane respectively blocks the remaining portion of the outer end of said passage and provides a forwardly directed surface therein.

2. A jet engine assembly as claimed in claim 1 in which there are a plurality of said guide vanes which are pivotally mounted, there being provided a linkage, actuated by movement of the respective thrust reverser member, for effecting pivotal movement of the guide vanes.

3. A jet engine assembly comprising a nacelle which has an outer wall and a divergent internal wall at its downstream end, a jet engine mounted within said nacelle with an annular space therebetween, the upstream end of said annular space being open to boundary layer flow and the downstream end thereof being open to the flow of exhaust gases from the engine, whereby boundary layer air is drawn into the exhaust gases by the ejector effect of the latter, the said divergent internal wall extending downstream of the downstream end of the engine, the said engine having a final propulsion nozzle, thrust reverser members pivotally mounted on a portion of said nozzle at their downstream ends, means for pivoting the thrust reverser members about their downstream ends between an inoperative position, in which they form a part of the said divergent internal wall, and an operative position, in which the upstream ends of said thrust reverser members are in contact with each other and they block the nozzle, forwardly directed gas flow passages adapted to communicate with the said downstream ends of said thrust reversers, and guide members pivotally connected to said thrust reverser members intermediate the ends thereof and slidably connected to the outer wall of said nacelle by pin and slot connections and movable in unison with the thrust reverser members so that when the latter are respectively in their inoperative and operative positions the guide members are respectively in an inoperative position in which they effect at least partial blocking of the forwardly directed gas flow passages and an operative position in which they unblock the gas flow passages and form forwardly directed walls thereof which are adapted to direct the exhaust gases forwardly, at least one guide vane carried by the nozzle, and means for moving said guide vane in unison with the thrust reverser members and said guide members between inoperative and operative positions in which the guide vane respectively blocks the remaining portion of said passage and provides a forwardly directed surface therein.

4. The jet engine assembly as defined in claim 3 in which the nacelle outer wall is spaced from the divergent internal wall, said forwardly directed gas passages extend through both said walls and the pin and slot connections to the nozzle are with the external wall so that at least one guide vane and guide member closes a forwardly directed gas passage where it extends through said external wall when in an inoperative position and has a minimum extension beyond said external wall when in an operative position.

5. A jet engine assembly as claimed in claim 3 in which the said portion is a divergent portion of the nozzle.

References Cited by the Examiner

UNITED STATES PATENTS

| | | | |
|---|---|---|---|
| 2,798,362 | 7/57 | Rainbow et al. | 60—35.54 |
| 2,802,333 | 8/57 | Price et al. | 60—35.54 |
| 2,847,823 | 8/58 | Brewer | 60—35.54 |
| 2,886,946 | 5/59 | Parker | 60—35.54 |
| 2,945,346 | 7/60 | Arnzen | 60—35.54 |
| 3,002,342 | 10/61 | Schatzki | 60—35.54 |
| 3,059,426 | 10/62 | Laucher et al. | 60—35.54 |

SAMUEL LEVINE, *Primary Examiner.*